United States Patent
Chi et al.

(10) Patent No.: US 10,341,282 B2
(45) Date of Patent: Jul. 2, 2019

(54) IDENTIFYING DIGITAL MAGAZINE SERVER USERS BASED ON ACTIONS BY THE USERS WITH CONTENT ITEMS PRESENTED BY THE DIGITAL MAGAZINE SERVER

(71) Applicant: Flipboard, Inc., Palo Alto, CA (US)

(72) Inventors: Sang Chi, Burlingame, CA (US); H L Peter Shu, Sunnyvale, CA (US); Colin DuRant, San Jose, CA (US); Christopher Allen, Mountain View, CA (US)

(73) Assignee: Flipboard, Inc., Palo Alto, CA (US)

( * ) Notice: Subject to any disclaimer, the term of this patent is extended or adjusted under 35 U.S.C. 154(b) by 296 days.

(21) Appl. No.: 14/852,431

(22) Filed: Sep. 11, 2015

(65) Prior Publication Data
US 2017/0078239 A1   Mar. 16, 2017

(51) Int. Cl.
| | | |
|---|---|---|
| *G06Q 10/10* | (2012.01) | |
| *G06F 11/34* | (2006.01) | |
| *H04L 12/58* | (2006.01) | |
| *H04L 29/08* | (2006.01) | |

(52) U.S. Cl.
CPC ............. *H04L 51/32* (2013.01); *H04L 67/22* (2013.01); *G06F 11/34* (2013.01); *G06F 11/3438* (2013.01); *G06F 2201/81* (2013.01); *G06Q 10/10* (2013.01)

(58) Field of Classification Search
CPC .. G06F 11/34; G06F 11/3438; G06F 11/3466; G06F 11/3476; G06F 2201/81; G06F 17/30867; H04L 67/22; H04L 51/32; H04L 67/306; H04L 65/4084; G06Q 10/10; G06Q 50/01; G06Q 30/0269; G06Q 30/0255; H04W 4/21; H04N 21/4788
See application file for complete search history.

(56) References Cited

U.S. PATENT DOCUMENTS

| | | | | |
|---|---|---|---|---|
| 7,502,797 | B2 * | 3/2009 | Schran | ............ G06F 11/34 |
| 7,707,284 | B2 * | 4/2010 | Friedman | ............ G06F 11/3438 |
| | | | | 709/224 |
| 2005/0086255 | A1 * | 4/2005 | Schran | ............ G06F 11/34 |
| 2007/0033187 | A1 * | 2/2007 | Friedman | ............ G06F 11/3438 |
| 2009/0327482 | A1 * | 12/2009 | Malhotra | ............ G06F 11/30 |
| | | | | 709/224 |
| 2011/0113086 | A1 * | 5/2011 | Long | ............ G06Q 10/10 |
| | | | | 709/203 |

(Continued)

*Primary Examiner* — Edward Kim
(74) *Attorney, Agent, or Firm* — Fenwick & West LLP

(57) ABSTRACT

A digital magazine server presents content to a user that includes various content items. The user may provide a comment to the digital magazine server for association with a content item and may identify an additional user in the comment. To allow the user to more easily identify the additional user, the digital magazine server associates information identifying users who have performed actions with the content item in association with the content item. The digital magazine server compares information in a request to provide a comment to the information identifying the users who have performed actions with the content item and presents the user with information identifying users who have performed actions with the content item that at least partially matches a portion of the information in the request.

16 Claims, 4 Drawing Sheets

(56) References Cited

U.S. PATENT DOCUMENTS

| | | | | |
|---|---|---|---|---|
| 2011/0288935 A1* | 11/2011 | Elvekrog | ........... | G06O 30/0241 |
| | | | | 705/14.53 |
| 2012/0191776 A1* | 7/2012 | Ruffner | .............. | G06Q 30/0201 |
| | | | | 709/204 |
| 2012/0219191 A1* | 8/2012 | Benzarti | ............ | G06Q 30/0201 |
| | | | | 382/106 |
| 2012/0265806 A1* | 10/2012 | Blanchflower | ........ | G06Q 10/10 |
| | | | | 709/204 |
| 2013/0289939 A1* | 10/2013 | Brdiczka | ................ | G06Q 50/01 |
| | | | | 702/179 |
| 2014/0012909 A1* | 1/2014 | Sankar | ................... | G06Q 50/01 |
| | | | | 709/204 |
| 2014/0074934 A1* | 3/2014 | van Hoff | ................. | H04L 65/40 |
| | | | | 709/204 |
| 2014/0236916 A1* | 8/2014 | Barrington | ............. | G06Q 10/10 |
| | | | | 707/706 |
| 2015/0006646 A1* | 1/2015 | Jones | ...................... | H04L 51/32 |
| | | | | 709/206 |
| 2015/0172334 A1* | 6/2015 | Gomba | .............. | H04L 12/1813 |
| | | | | 715/753 |
| 2015/0181297 A1* | 6/2015 | Roberts | ................. | H04H 60/33 |
| | | | | 725/37 |

\* cited by examiner

IDENTIFYING DIGITAL MAGAZINE SERVER USERS BASED ON ACTIONS BY THE USERS WITH CONTENT ITEMS PRESENTED BY THE DIGITAL MAGAZINE SERVER

BACKGROUND

This invention relates generally to user interaction with a digital magazine application executing on a client device, and more specifically to identifying users of a digital magazine server based on user interactions with content provided by the digital magazine server.

Online systems select and present various content items to their users to encourage the users to interact with the online system. For example, an online system selects various content items for presentation to a user based on information associated with the user and actions performed by the user that are identified to the online system. The online system communicates the selected content items to a client device for presentation to the user and receives information from the client device describing the user's interactions with the content items.

A user presented with content items from an online system may perform a variety of actions with the presented content items via an application associated with an online system that executes on a client device. The user may identify additional users when providing comments on presented content items or when providing additional content to the online system. By identifying additional users when providing a comment on a presented content item, the user may increase the likelihood of the additional users accessing the content item. This may increase overall user interaction with the online system, However, as many online systems have an increasingly large number of users, it may be difficult for a user to identify one or more additional users when providing content or providing comments to the online system. For example, a user may become frustrated by navigating through information identifying multiple other online system users, causing the user to stop interacting with the online system before identifying additional users. This may reduce the likelihood of the additional users viewing content items and subsequently interacting with the online system.

SUMMARY

A digital magazine server retrieves content from one or more sources and generates a personalized, customizable digital magazine for a user based on the retrieved content. The generated digital magazine provided to a client device (such as a mobile communication device, tablet, computer, or any other suitable computing system) for presentation to a user of the digital magazine server. In various embodiments, the digital magazine server communicates the digital magazine to an application associated with the digital magazine server that is executing on a client device; the application presents the digital magazine to the user and receives actions from the user with content presented by the application. Actions by the user with the application may be communicated to the digital magazine server, which selects content for the digital magazine based on the actions performed by the user. For example, based on selections made by the user via the application, the digital magazine server generates a digital magazine including one or more sections including content items retrieved from a number of sources and personalized for the user. The generated digital magazine allows the user to more easily consume content that interests and inspires the user by presenting content items in an easily navigable interface via a client device.

A user may perform a variety of actions with the application, including identifying other users of the digital magazine server in association with a content item presented by the digital magazine server. For example, the user identifies an additional user in a comment provided by the user for association with a content item. To identify the additional user, the user provides text data to the digital magazine server, which identifies a set of users associated with identifying information that at least partially matches the text data. For example, the digital magazine server identifies a set of users associated with user names or names in a user profile that at least partially match the text data.

As the digital magazine server may maintain information identifying a large number of users, to allow the user to more efficiently identify additional users, the digital magazine server also maintains information identifying users who have performed various actions with a content item presented by the digital magazine server. In various embodiments, the digital magazine server associates information identifying users who were presented with a content item and who performed one or more actions with the content item. For example, the digital magazine server stores information identifying users who have performed one or more actions with a content item in association with an identifier of the content item. If a user provides a comment associated with the content item that identifies an additional user, the digital magazine server may automatically include information identifying candidate users who are associated with identifying information that at least partially matches text data in the comment. To increase the likelihood of the information identifying candidate users including information identifying the additional users, the digital magazine server retrieves information identifying users who were presented with the content item and who performed one or more actions with the content item and compares information in the comment with the information identifying the users who were presented with the content item and who performed one or more actions with the content item. The digital magazine server identifies candidate users having identifying information that at least partially matches data included in the comment from the users who were presented with the content item and who performed one or more actions with the content item and presents information identifying one or more of the candidate users to the user.

From the presented information identifying the one or more candidate users, the user may select information identifying a candidate user to identify in the comment. In various embodiments, the digital magazine server presents information identifying different candidate users in an order based on an amount of information identifying different candidate users matching at least a portion of data included in the comment. For example, candidate users associated with a greater percentage of identifying information matching at least a portion of text data included in a request to provide a comment for association with the content item that includes the comment. After the user selects information identifying the candidate user, the digital magazine server includes the selected information identifying the candidate user in the comment for presentation to other users via the comment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital magazine server generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
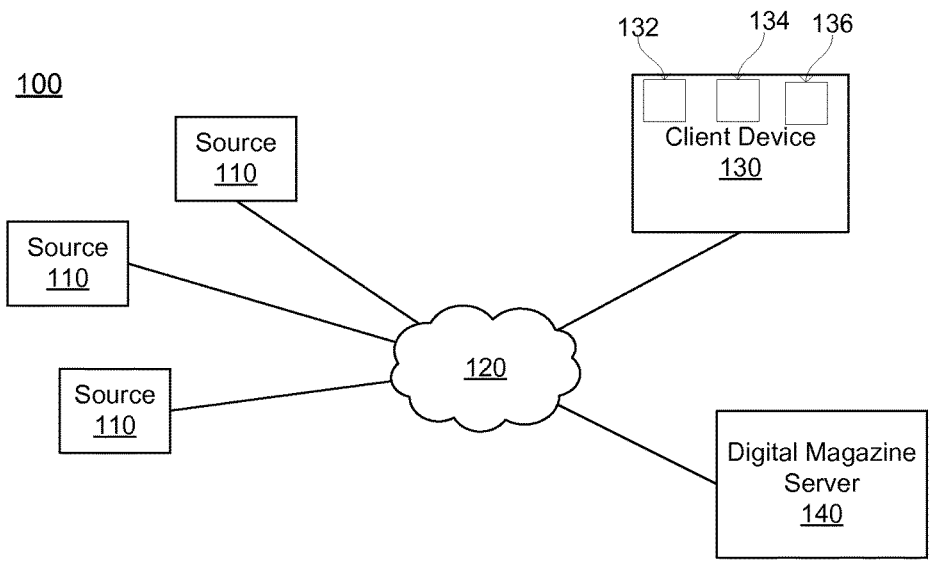
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) extensible markup language (XML) or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The client device 130 executes an application 136 associated with the digital magazine server 140 that receives content form the digital magazine server 140 and presents the received content to a user associated with the client device 130. Additionally, the user performs various actions with the application 136, such as actions with content from the digital magazine server 140 presented by the application 136. For example, the application 136 presents various content items received from the digital magazine server 140 and receives actions from the user with one or more of the content items. Example actions by bye user with content items presented by the application 136 include: accessing a content item, viewing a content item, sharing a content item with another user of the digital magazine server 140, saving a content item to the client device 130, providing a comment associated with a content item, and providing a content item to the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
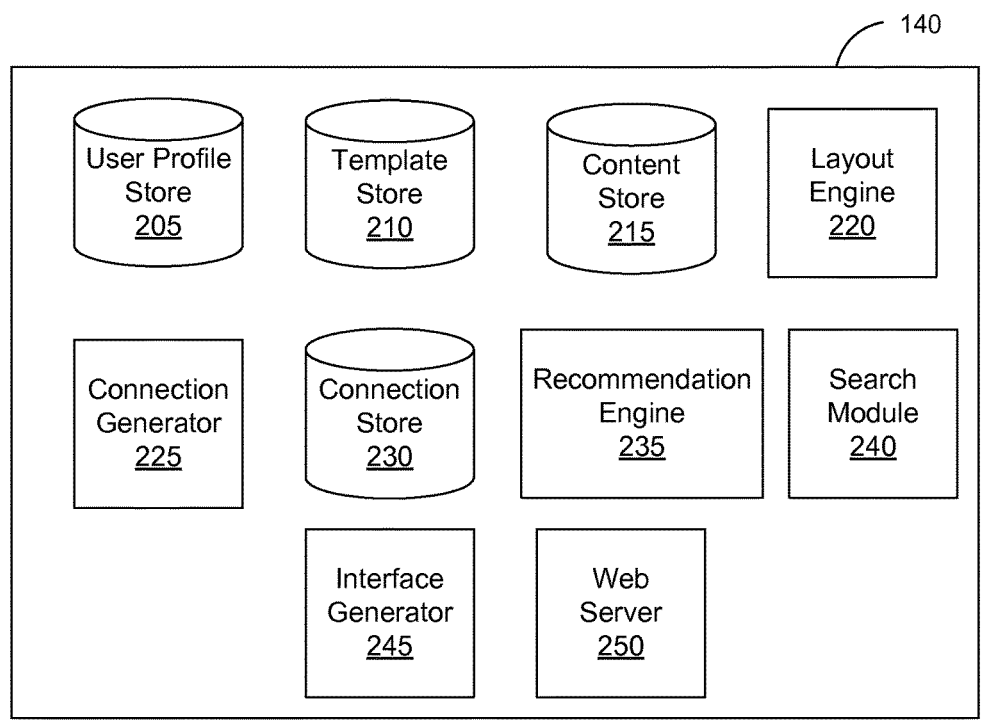
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding digital magazine server user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2013, each of which is hereby incorporated by reference in its entirety.

The content store 215 stores objects that each represent various types of content. For example, the content store 215 stores content items received from one or more sources 110 within a threshold time of a current time. Examples of content items stored by the content store 215 include a page post, a status update, an image, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

In some embodiments, the connection store 230 includes information identifying users who have performed one or more interactions with content items presented to the users. For example, the connection store 230 includes a table associated with an identifier of a content item, with entries in the table including information identifying users who performed one or more actions associated with the content item. An entry in the table may also identify one or more actions performed by the user associated with the content item, and a timestamp may be associated with various actions in some embodiments. Additionally, the connection store 230 may identify users who have performed certain actions associated with the content item. For example, the connection store 230 includes information identifying users who have performed one or more actions from a set of actions with the content item but does not include information identifying users who have not performed at least one action form the set of actions. Information identifying users who have performed one or more actions with a content item may be used to identify one or users to another user of the digital magazine server, as further described below in conjunction with FIGS. 4 and 5.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and the application 136 executing on a client device 130. For example, the digital magazine server 140 provides a set of rules each identifying desired actions for a user to perform and information describing actions previously performed by the user to the application 136. As the user interacts with the application 136, the application 136 identifies one or more rules including at least a threshold amount of information describing actions previously performed by the user matching actions performed by the user with the application. A desired action included in an identified rule is presented to the user by the application 136 to entice the user to perform the desired action via the application 136.

Page Templates

Figure 3:
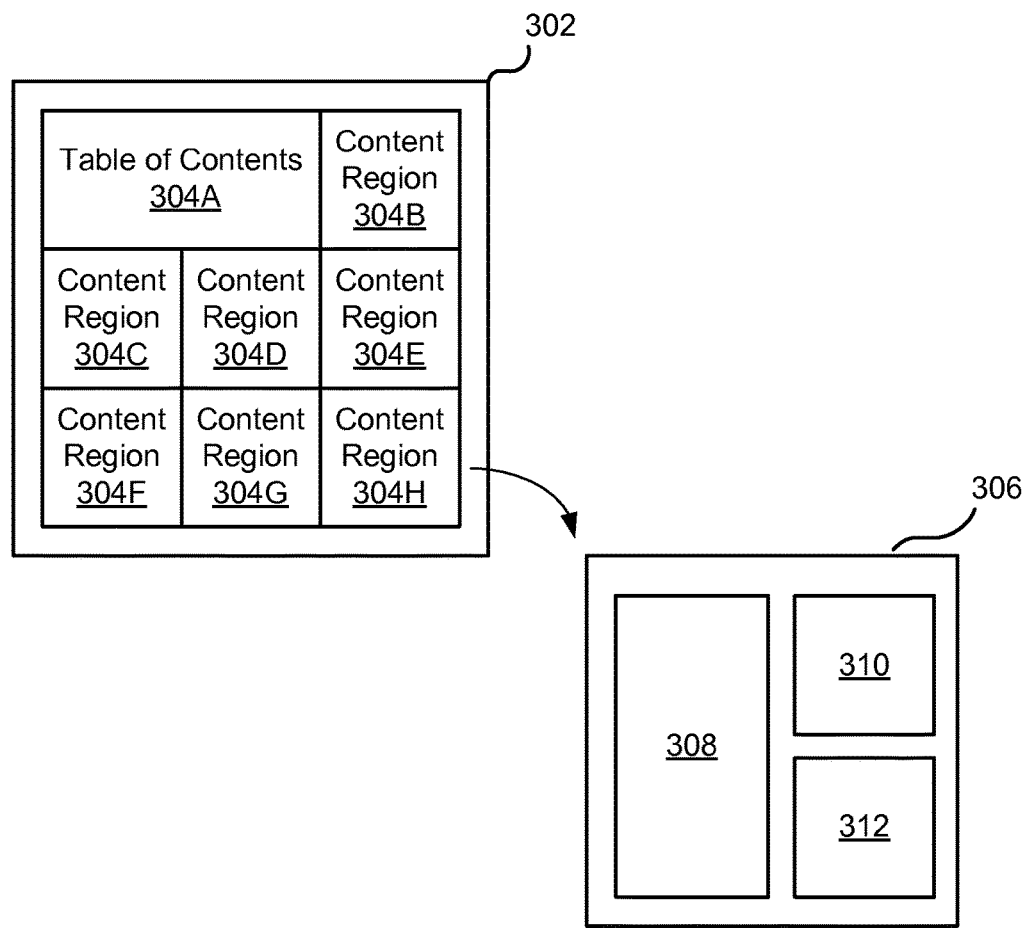
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Identifying Users Based at Least in Part on Actions with Content Items

Figure 4:
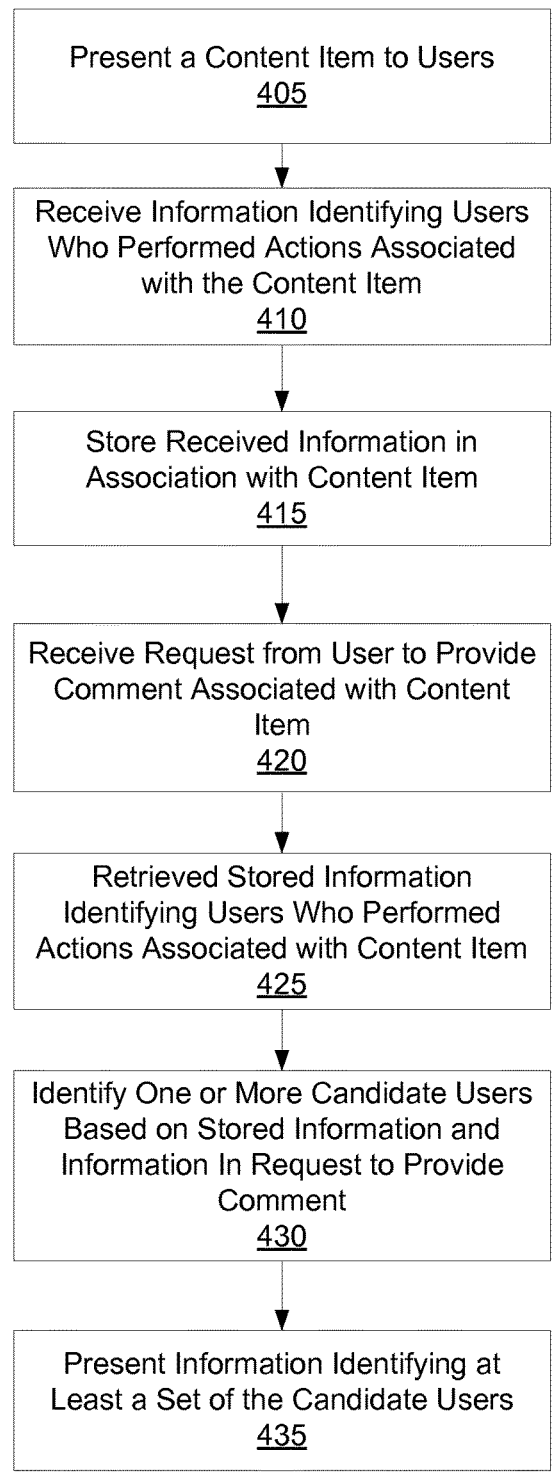
FIG. 4 is a flowchart of a method for identifying a user of a digital magazine server based at least in part on a content item, in accordance with an embodiment of the invention.

FIG. 4 shows one embodiment of a method for identifying a user of a digital magazine server 140 based at least in part on a content item. In other embodiments, the method includes different or additional steps than those described in conjunction with FIG. 4. Additionally, in some embodiments, the method may perform steps in different orders than the order described in conjunction with FIG. 4.

A digital magazine server 140 retrieves content from one or more sources 110 and selects content for various users from the retrieved content. For example, the digital magazine server 140 generates a personalized, customizable digital magazine for a user based on the retrieved content. As described above in conjunction with FIGS. 1 and 2, the digital magazine server 140 communicates content selected for a user to a client device 130 associated with the user for presentation. The digital magazine server 140 may generate different digital magazines for various users, and one or more content items may be included in multiple digital magazines for presentation to various users. Additionally, the digital magazine server 140 may present a digital magazine to various users. Hence, the digital magazine server 140 presents 405 a content item to multiple users. Alternatively, the content item is presented 405 to a user via a digital magazine personalized for the user.

Users to whom the content item is presented may perform a variety of actions with the content item. Example actions include: accessing the content item, viewing the content item, sharing the content item with another user of the digital magazine server 140, saving the content item to the client device 130, providing a comment associated with the content item, and indicating a preference for the content item. As users perform actions with the content item, the digital magazine server 140 receives 410 information identifying the actions. In various embodiments, the digital magazine server 140 receives 410 an identifier of the content item, information identifying a user who performed an action, and a description of the action when the user performs an action with the content item. However, the digital magazine server 140 may receive any suitable information identifying a user and an action performed by the user that is associated with or that involves the content item.

The digital magazine server 140 stores 415 the received information in association with the content item. In various embodiments, the digital magazine server 140 stores information identifying each user who performed an action with the content item in association with the content item. For example, the digital magazine server 140 stores 415 a username or a user identifier associated with each user who performed an action with the content item in association with an identifier of the content item. In some embodiments, the digital magazine server 140 stores 415 information identifying users who performed certain actions with the content item in association with the content item. For example, the digital magazine server 140 stores 415 information identifying users who performed one or more actions included in a set of actions with the content item in association with the content item.

When the digital magazine server 140 receives 420 a request from a user to provide a comment associated with the content item that identifies an additional user of the digital magazine sever 140, the digital magazine server 140 retrieves 425 the stored information identifying users who previously performed at least one action associated with the content item. In various embodiments, the user includes a specific character or symbol in text data included in the comment that indicates text data received subsequent to the specific character or symbol corresponds to information identifying an additional user of the digital magazine server 140. For example, the request for the comment includes a "@" symbol, so text data received subsequent to the "@" symbol is information identifying an additional user of the digital magazine server 140. Hence, in some embodiments, if the received request to provide the comment includes one or more specific characters, the digital magazine server 140 retrieves 425 stored information identifying the users who previously performed one or more actions associated with the content item.

The digital magazine server 140 compares information in the request from the user to provide the comment with retrieved information identifying the users who previously performed one or more actions associated with the content item and identifies 430 one or more candidate users based on the comparison. In various embodiments, the digital magazine server 140 identifies 430 users having information identifying the users that at least partially matches data included in the request to provide the comment. The digital magazine server 140 may compare information identifying various users who performed one or more actions associated with the content item to a portion of the information in the request to provide the comment, such as information in the request to provide the comment having one or more characteristics. For example, the digital magazine server 140 identifies 430 a candidate user as a user having information identifying the user that at least partially matches a portion of the data included in the request to provide the comment, such as data received subsequent to a specific character or symbol. As the digital magazine server 140 receives additional information in the request from the user to provide the comment, the digital magazine server 140 modifies the identified candidate users so users having information identifying the user that at least partially matches the received information and the received information are identified 430 as candidate users.

To allow the user to more efficiently identify the additional user in the comment, the digital magazine server 140 presents 435 information identifying each user in a set of the identified candidate users to the user. For example, the digital magazine server 140 communicates usernames of candidate users in the set or communicates names from user profiles associated with candidate users in the set to a client device 110 associated with the user for presentation. The digital magazine server 140 may order the identified candidate users based at least in part on an amount of information identifying various candidate users matching at least a portion of the information in the request to provide the comment. For example, candidate users associated with identifying information matching greater amounts (e.g., greater percentages) of a portion of the information have higher positions in the order. Information identifying users in the set of candidate users may be presented 435 according to the order in various embodiments. Alternatively, the digital magazine server 140 orders information identifying users in the set of candidate users based on other suitable criteria and presents 435 information identifying the users based on the order. For example, the digital magazine server 140 orders information identifying users in the set of candidate users based on a frequency with which the candidate users have performed actions associated with the content item, a frequency with which the candidate users interact with the digital magazine server 140, a number of actions performed by the candidate users with content items provided by the digital magazine server 140, a number or a frequency of actions associated with the user and with the candidate users, or based on any other suitable criteria.

Figure 5:
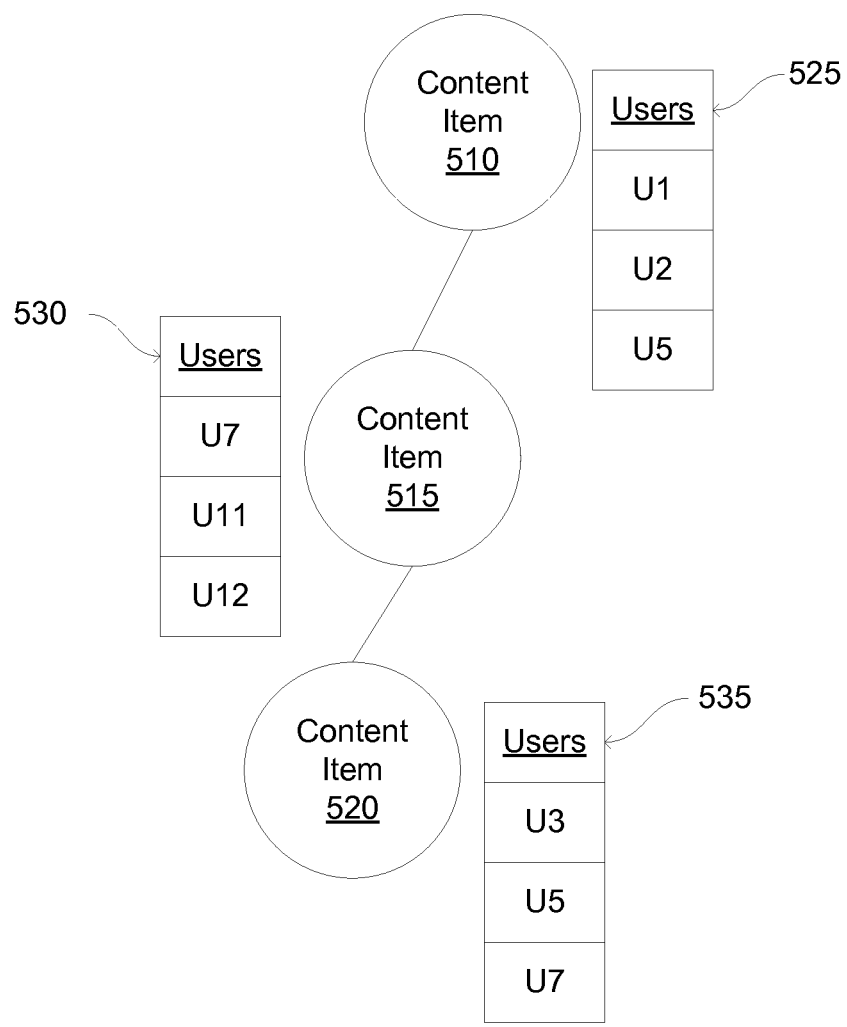
FIG. 5 is an example of connections between content items and users who performed actions with the content items maintained by a digital magazine server, in accordance with an embodiment of the invention.

In some embodiments, the digital magazine server 140 maintains relationships between various content items, such as a hierarchical relationship between content items within a section of a digital magazine or within a digital magazine. For example, the digital magazine server 140 maintains connections between content items within a section of digital magazine or between content items that are presented in a specific order. FIG. 5 shows an example of a relationship between content items within a digital magazine. In the example of FIG. 5, content item 510, content item 515, and content item 520 are included in a section of a digital magazine. Information identifying users who performed actions associated with each of the content items 510, 515, 520. Identifying information 525 is associated with content item 510 and identifies users who performed actions associated with content item 510. Similarly, identifying information 530 is associated with content item 515 and identifies users who performed actions associated with content item 515; identifying information 535 is associated with content item 520 and identifies users who performed actions associated with content item 520.

When comparing information in the request from the user to provide the comment with retrieved information identifying the users who previously performed one or more actions associated with a content item to identify 430 one or more candidate users, the digital magazine server 140 may account for connections between the content item and additional content items by comparing the information in the request from the user to provide the comment with information identifying users who previously performed one or more actions associated with additional content items connected to the content item. In some embodiments, the digital magazine server 140 compares information in the request from the user to provide the comment with retrieved information identifying the users who previously performed one or more actions associated with additional content items connected to the content item if the information in the request does not match at least a threshold amount of information identifying one or more users who performed actions associated with the content item. For example, in FIG. 5, if the request is to provide a comment for association with content item 520 that does not include information matching at least a threshold amount of information identifying one or more users included in identifying information 535, the digital magazine sever 140 also compares the information included in the request to identifying information 530 associated with content item 515 and to identifying information 525 associated with content item 510, as content items 510, 515 are directly or indirectly connected to content item 520. As an example, if the request includes information that partially matches information identifying users U1 and U11, the digital magazine server 140 may identify users U1 and U11 by comparing information in the request to identifying information 525 and identifying information 530 even though identifying information 535 does not include information identifying U1 or U11. In various embodiments, the digital magazine server 140 may maintain a maximum degree of separation specifying a maximum number of intervening content items between a content item and another content item and compares information in the request to information identifying users who performed interactions with content items having connections to no more than the maximum number of intervening content items before a connection between an intervening content item and the content item. Additionally, in various embodiments, the digital magazine server 140 initially compares the information in the request to information identifying users who performed one or more actions with additional content items connected to the content item to increase a likelihood of identifying users who performed one more actions with content items when a request to provide a comment for association with the content item is received.

The user may select information identifying a candidate user from the presented information identifying the candidate users in the set to select the candidate user as the additional user identified in the comment. If the user selects information identifying a candidate user, the selected information identifying the candidate user is included in the comment for association with the content item. When the digital magazine server 140 receives an indication the comment to be provided is completed, the digital magazine server 140 subsequently presents the comment including the selected information identifying the candidate user to one or more digital magazine server users. In some embodiments, the digital magazine server 140 also notifies the identified candidate user that the identified candidate user was included in a comment associated with the content item. The notification may identify the user who provided the comment for association with the content item and may also identify the content item itself.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   presenting a content item to a plurality of users of a digital magazine server;
   receiving information identifying actions performed by a set of users involving the content item, each of the set of users presented with the content item;
   storing information identifying each user in the set of users in association with the content item;
   receiving a request from a user to provide a comment in association with the content item including data that identifies an additional user, the request including data comprising the comment;
   retrieving the information identifying each user in the set of users presented with the content item;
   identifying candidate users of the set of users presented with the content item based on the information identifying each user in the set of users presented with the content item and information included in the comment, each candidate user associated with information identifying the candidate user that at least partially matches the data included in the comment identifying the additional user;
   determining an order of information identifying each candidate user based on a frequency with which each candidate user performed actions involving the content item presented to each of the candidate users by the digital magazine server; and
   presenting information identifying the one or more candidate users to the user in the determined order.

2. The method of claim 1, further comprising:
   receiving a selection of information identifying a candidate user from the presented information; and
   including the selected information identifying the candidate user from the presented information in the comment.

3. The method of claim 2, further comprising:
   presenting the comment including the selected information to one or more users of the digital magazine server in association with the content item.

4. The method of claim 1, wherein storing information identifying each user in the set of users in association with the content item comprises:
   storing information identifying each user who performed one or more actions from a set of actions with the content item in association with the content item.

5. The method of claim 4, wherein the set of actions includes one or more selected from a group consisting of: accessing the content item, viewing the content item, sharing the content item with another user of the digital magazine server, saving the content item to a client device, providing an additional comment associated with the content item, indicating a preference for the content item, and any combination thereof.

6. The method of claim 1, wherein identifying one or more candidate users based on the information identifying each user in the set of users and information included in the comment comprises:
   identifying one or more additional content items connected to the content item;
   retrieving information associated with each additional content item identifying users who performed one or more actions associated with each additional content item; and
   identifying the one or more candidate users based at least in part on the retrieved information associated with each additional content item, each candidate user associated with information identifying the candidate user that at least partially matches data included in the comment.

7. The method of claim 6, wherein an additional content item connected to the content item is a content item included in a section of a digital magazine that includes the content item.

8. The method of claim 6, wherein identifying one or more additional content items connected to the content item comprises:
   responsive to determining the information identifying each user in the set of users does not at least partially match data included in the comment, identifying the one or more additional content items connected to the content item.

9. A computer program product comprising a non-transitory computer readable storage medium having instructions encoded thereon that, when executed by a processor, cause the processor to:
   present a content item to a plurality of users of a digital magazine server;
   receive information identifying actions performed by a set of users involving the content item, each of the set of users presented with the content item;
   store information identifying each user in the set of users in association with the content item;
   receive a request from a user to provide a comment in association with the content item including data that identifies an additional user, the request including data comprising the comment;
   retrieve the information identifying each user in the set of users presented with the content item;
   identify one or more candidate users of the set of users presented with the content item based on the information identifying each user in the set of users presented with the content item and information included in the comment, each candidate user associated with information identifying the candidate user that at least partially matches the data included in the comment identifying the additional user;
   determining an order of information identifying each candidate user based on a frequency with which each candidate user performed actions involving the content item presented to each of the candidate users by the digital magazine server; and present information identifying the one or more candidate users to the user in the determined order.

10. The computer program product of claim 9, wherein the non-transitory computer readable storage medium further has instructions encoded thereon that, when executed by the processor, cause the processor to:

receive a selection of information identifying a candidate user from the presented information; and include the selected information identifying the candidate user from the presented information in the comment.

11. The computer program product of claim 10, wherein the non-transitory computer readable storage medium further has instructions encoded thereon that, when executed by the processor, cause the processor to:

present the comment including the selected information to one or more users of the digital magazine server in association with the content item.

12. The computer program product of claim 9, wherein store information identifying each user in the set of users in association with the content item comprises:

store information identifying each user who performed one or more actions from a set of actions with the content item in association with the content item.

13. The computer program product of claim 12, wherein the set of actions includes one or more selected from a group consisting of: accessing the content item, viewing the content item, sharing the content item with another user of the digital magazine server, saving the content item to a client device, providing an additional comment associated with the content item, indicating a preference for the content item, and any combination thereof.

14. The computer program product of claim 9, wherein identify one or more candidate users based on the information identifying each user in the set of users and information included in the comment comprises:

identify one or more additional content items connected to the content item;

retrieve information associated with each additional content item identifying users who performed one or more actions associated with each additional content item; and identify the one or more candidate users based at least in part on the retrieved information associated with each additional content item, each candidate user associated with information identifying the candidate user that at least partially matches data included in the comment.

15. The computer program product of claim 14, wherein an additional content item connected to the content item is a content item included in a section of a digital magazine that includes the content item.

16. The computer program product of claim 14, wherein identify one or more additional content items connected to the content item comprises:

responsive to determining the information identifying each user in the set of users does not at least partially match data included in the comment, identify the one or more additional content items connected to the content item.

* * * * *